United States Patent

[11] 3,548,802

[72] Inventor Rudolph C. Green
Highway 71 S., Springdale, Ark. 72764
[21] Appl. No. 746,451
[22] Filed July 22, 1968
[45] Patented Dec. 22, 1970

[54] PELLET FIRING MECHANISM AND FLUID VALVE THEREFOR
10 Claims, 8 Drawing Figs.
[52] U.S. Cl....................................... 124/11,
124/41, 124/13, 124/31, 124/53
[51] Int. Cl..................................... F41b 11/06
[50] Field of Search........................... 124/11, 13,
14, 15, 41, 31, 52, 51, 53, 30

[56] References Cited
UNITED STATES PATENTS
822,645 6/1906 Benjamin ..................... 124/13
3,000,371 9/1961 Hyde............................ 124/51UX Primary Examiner—George J. Marlo
Assistant Examiner—William R. Browne
Attorney—Fishburn, Gold and Litman ABSTRACT: A fluid valve including a valve chamber with an inlet and outlet preferably axially aligned for use in pellet firing mechanisms having a fluid supply line for supplying fluid under pressure to the inlet, and a fluid flow line communicating with the outlet for fluid flow away from the chamber. A slidable seal member is mounted within the valve chamber for engaging the interior surface thereof in response to fluid pressure therein and said slidable seal member has a bore therethrough communicating with the outlet. A closure member or pellet is positioned in the fluid flow line to seal the outlet and engage the slidable seal member when the closure member or pellet is engaged by a retaining and release member.

INVENTOR.
RUDOLPH C. GREEN
BY
Fishburn, Gold & Litman
ATTORNEYS

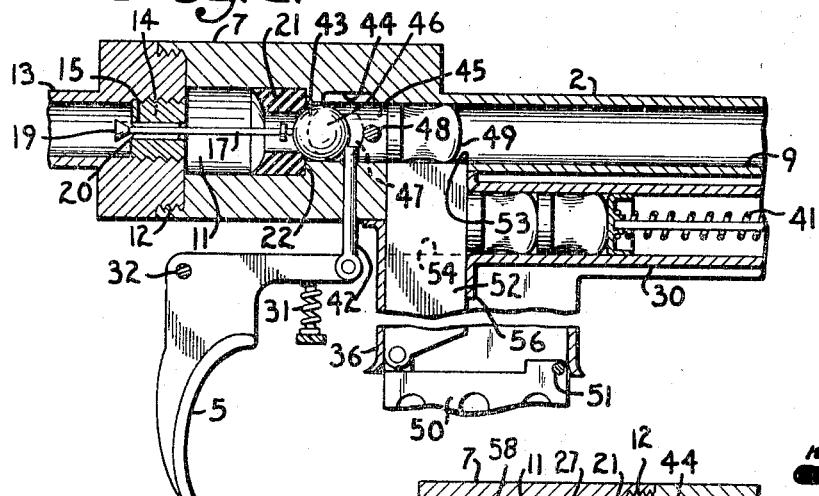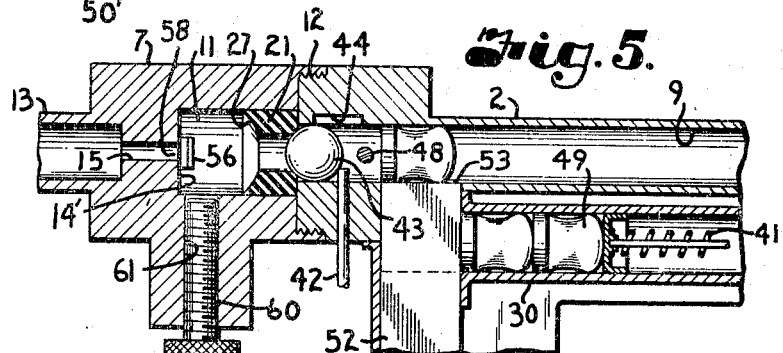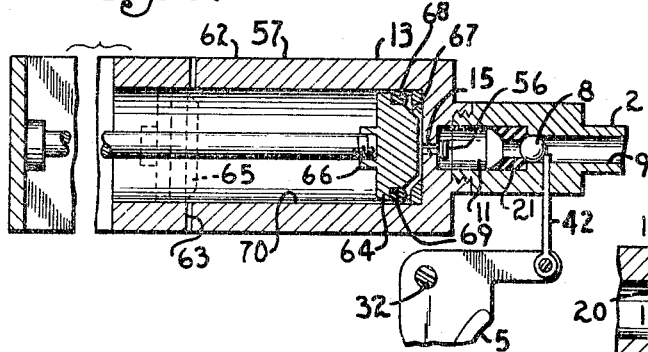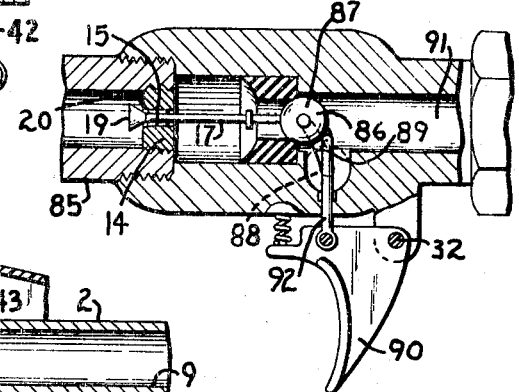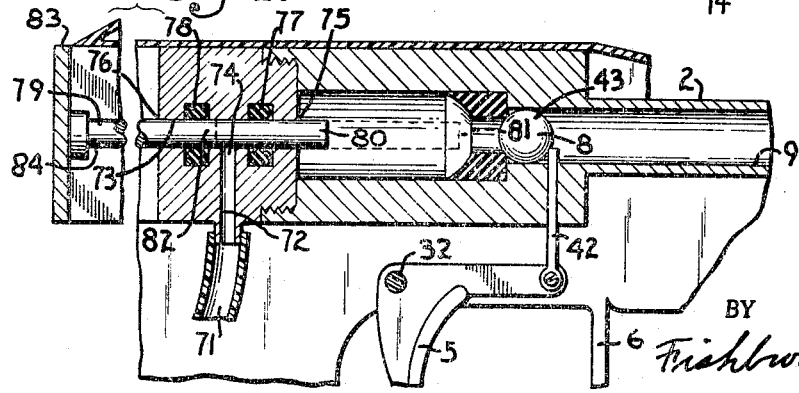

3,548,802

PELLET FIRING MECHANISM AND FLUID VALVE THEREFOR

This invention relates to pellet firing guns and more particularly to fluid valves and pellet loading and firing mechanisms for use in such guns using a fluid under pressure, such as compressed air or carbon dioxide gas, to propel a pellet outwardly through a barrel.

Heretofore, pellet firing mechanisms in guns using compressed air or gas to propel a pellet outwardly allowed the compressed air or gas to expand considerably with a corresponding loss of pressure before the air or gas worked on the pellet to move same out of the gun. These mechanisms have been quite complex, expensive, inefficient, and erratic in operation. Pop-open valves and spring-loaded valves heretofore used in pellet firing guns resulted in reduced firing accuracy due to a kick, bounce, or jar upon firing. Carbon dioxide gas commonly used in gas operated guns has a pressure determined by the temperature, therefore the accuracy of a pellet fired from those guns depended upon the temperature at the time of firing and therefore have not been uniform in performance.

The principal objects of the present invention are: to provide pellet firing mechanisms without the above-mentioned difficulties; to provide a fluid valve for use in fluid lines and in pellet firing mechanisms having a few simple operating parts; to provide such a valve having a chamber effectively sealed against fluid leakage; to provide such a valve for use in pellet firing mechanisms in which the pellet or closure member is positioned in an outlet of the valve chamber and engages a slidable seal member to seal the chamber outlet thereby eliminating pressure loss between the valve and the pellet; to provide such a valve in pellet firing mechanisms with a charge of fluid under pressure acting directly on the pellet with the full energy of the fluid charge; to provide such a valve having an inlet adapted to be sealed against fluid movement into or out of the chamber while the outlet is sealed by a closure member or pellet; to provide such a valve adapted to have the fluid pressure varied after sealing the inlet and outlet; to provide such a valve adapted to be sealed against entry of fluid in response to fluid pressure in a fluid supply line communicating with the inlet immediately after a pellet is fired; to provide a valve chamber having a nozzlelike orifice producing high velocity in a fluid discharging therefrom; to provide a slidable seal member which is engaged by the pellet or closure member and which has a lip engaging a portion of the interior surface of the valve chamber; to provide such a fluid valve having a stem valve therein with the stem extending through the inlet and into the valve chamber and having a seat sealing the valve chamber by preventing entry of fluid into the inlet until activated by a closure member or pellet at the outlet or nozzle; and to provide such pellet firing mechanisms and valves therefor which are simple, efficient in operation, economical to manufacture, and durable in use.

Other objects and advantages of this invention will become apparent from the following description taken in connection with the accompanying drawings wherein are set forth by way of illustration and example certain embodiments of this invention.

FIG. 4 is a partial longitudinal sectional view of a modified form of the fluid valve and modified pellet loading and firing mechanism.

FIG. 5 is a partial longitudinal sectional view of the modified form of the fluid valve of FIG. 4 showing a volume adjustment member and a check valve controlling fluid flow outwardly through an inlet to the valve chamber.

FIG. 6 is a partial longitudinal sectional view of an air cylinder communicating with the fluid valve.

FIG. 7 is a partial longitudinal sectional view of a modified form of the fluid valve having a pressure adjusting plunger.

FIG. 8 is a longitudinal sectional view of one form of the fluid valve for use in a fluid line.

Figure 1:
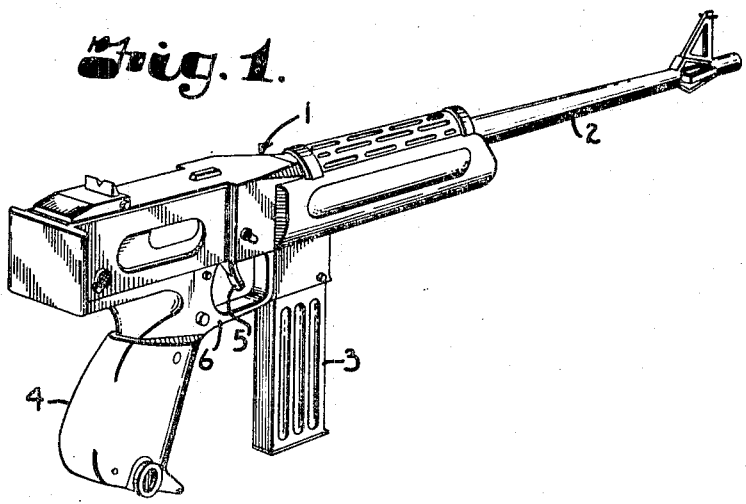
FIG. 1 is a perspective view of a pellet firing gun embodying features of the present invention.
Figure 2:
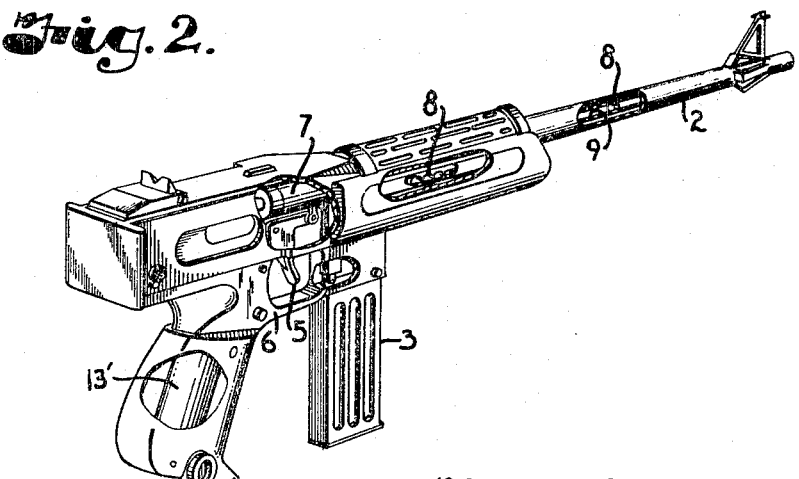
FIG. 2 is a perspective view of the pellet firing gun with portions broken away to show a bottle of gas and the working parts therein.

Referring more in detail to the drawings.

The reference numeral 1 generally designates a pellet firing gun having an elongate barrel 2, pellet loading mechanism 3, hand grip 4, trigger 5, and trigger guard 6.

A fluid valve 7 is particularly adapted to permit a measured volume or charge of fluid, such as pressurized carbon dioxide gas, to act directly upon a pellet 8 thereby projecting the pellet 8, when release, outwardly through a bore 9 of the barrel 2.

The fluid valve 7 has a body portion 10 with an elongate cylindrical bore 11 aligned with the bore 9 of the barrel 2, with the bore 11 forming a fluid chamber to contain a charge of fluid under pressure. The bore 11 has a larger diameter than the bore 9 and larger than the pellet 8. A threaded counterbore 12 has a larger diameter than the bore 11 and is adapted to receive and seat a fluid supply line 13 having one end thereof threaded. The fluid supply line 13 is connected to a suitable source of fluid under pressure, such as a container of gas 13' or an air pump for supplying fluid under pressure to the chamber formed by the bore 11. The one end of the fluid supply line 13 is closed by an end plug 14 having a bore 15 therethrough. The end plug 14 is suitably retained in the one end of the fluid supply line 13, as by engaging threads 16. The bore 15 functions as a fluid inlet to the bore 11 of the fluid valve 7.

In the illustrated structure, the bore 15 and a bore 9 in the barrel 2 are axially aligned to permit straight line flow through the fluid valve 7. The bore 9 in the barrel 2 is an outlet for fluid from the valve 7. A suitable fluid under pressure, such as a carbon dioxide gas, communicates with the bore 11 through the bore 15 or fluid inlet in the end plug 14.

A stem valve 17 is positioned in the bore 15 and is operative to seal the bore 15 against fluid flow through the bore 15. In the structure illustrated in FIG. 3 the stem valve 17 has an elongate stem 18 extending through the bore 15 and into the bore 11. The stem 18 of the stem valve 17 has a valve head 19 positioned in the fluid supply line 13. The valve head 19 seals the bore 15 by being seated at a bore entrance or seat 20 in response to fluid pressure in the fluid supply line 13 when the bore 11 is empty or substantially fluidfree so that the pressure in the bore 11 is less than in the fluid supply line 13. Entry of fluid into the bore 11 is thereby prevented until the valve head 19 is unseated.

A slidable and expandable seal member 21 is positioned within the bore 11 and is slidable to a stop or shoulder 22 adjacent the bore 9 of the barrel 2 and is adapted to sealingly engage an interior surface 23 of the bore 11. The seal member 21 has a bore 24 of the bore 11. The seal member 21 has a bore 24 therethrough which is aligned with the bore 9 of the barrel 2. The seal member 21 may be of any suitable elastic material, such as rubber, neoprene, or plastic, depending on the nature of the fluid flowing through the fluid valve 7.

In the illustrated structure the slidable seal member 21 is cylindrical and the bore 24 therethrough has a cylindrical portion 25 nearest the bore 9 in the barrel 2 and an enlarged portion 26 extending outwardly from the cylindrical portion 25 toward the interior surface 23 of the bore 11. The fluid pressure or charge in the bore 11 expands a lip or outer margin 27 of the enlarged portion 26 into sealing engagement with the cylindrical interior surface 23 of the bore 11. The enlarged portion 26 is preferably conical however, a curved shape, such as a concave dome, may be employed thereby funneling the fluid from the bore 11 into the nozzlelike orifice formed by the cylindrical portion 25.

The pellet loading mechanism 3 is adapted to position the pellet 8 in the bore 9 of the barrel 2 and retain same until released for firing. The pellet 8 has a larger diameter than the cylindrical portion 25 of the bore 24 therefore the pellet 8 engages the slidable seal member 21 and slides same toward the end plug 14 and away from the shoulder 22. Fluid pressure in the bore 11 slides the seal member 21 toward the stop or shoulder 22 and increases the seating engagement of the cylindrical portion 25 of the bore 24 against the pellet 8.

The stem 18 has one end 28 extending into the cylindrical portion 25 of the bore 24 where the one end 28 is engaged by the pellet 8 when the pellet 8 is moved into the bore 9 of the barrel 2 thereby moving the stem valve 17 and thereby the valve head 19 from its position seated at and sealing the bore entrance 20 and into the fluid supply line 13. Fluid pressure in the bore 11 and in the fluid supply line 13 tend to equalize when the pellet 8 is in a sealing position 29 and the valve head 19 is not is not in the seating engagement with the inlet bore entrance 20.

In the illustrated structure, the pellet 8 is moved into the barrel 2 only when the barrel 2 is empty and there is no fluid pressure in the bore 11 therefore the pellet 8 engages the seal member 21 and slides same toward the end plug 14 while being seated at the bore 24. During the movement toward the end plug 14, the pellet 8 engages the one end 28 and moves the stem valve 17 out of seating engagement with the bore entrance or seat 20 thereby permitting fluid to flow through the bore 15 into the bore 11 where the fluid pressure expands the lip or outer margin 27 into sealing engagement with the interior surface 23 of the bore 11 and increases the seating engagement of the seal member 21 with the pellet 8.

Figure 3:
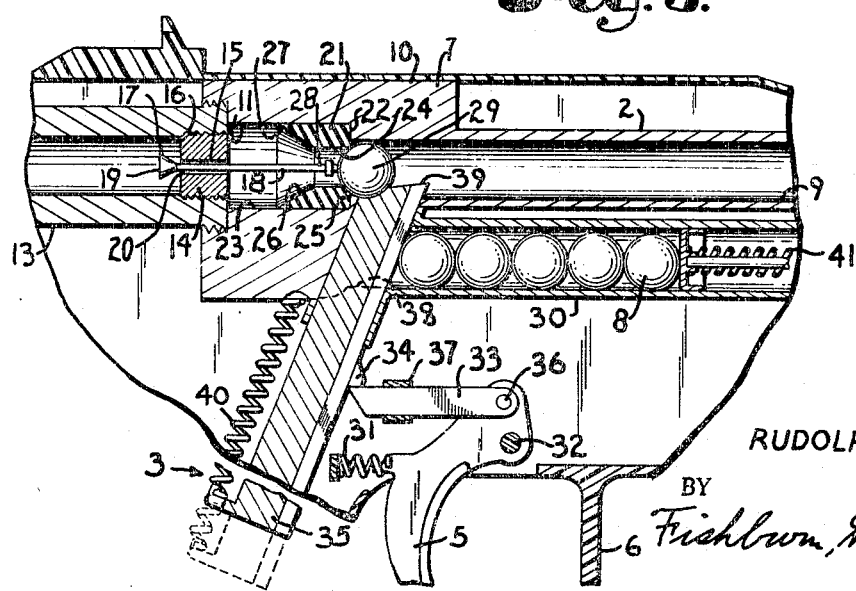
FIG. 3 is a partial longitudinal sectional view of the pellet firing gun showing a fluid valve and a pellet loading and firing mechanism.

The fluid valve 7 illustrated in FIG. 3 is particularly adapted to permit a measured volume of fluid, such as compressed air or carbon dioxide gas, to pass from the chamber formed by the bore 11 through the bore 24 into the bore 9 of the barrel 2. When the measured volume of fluid flows into the bore 9 fluid pressure in the fluid supply line 13 moves the valve head 19 into seating and sealing engagement with the bore entrance 20. The valve head 19 remains in seating engagement until another pellet 8 is moved to engage the one end 28 of the stem 18 to unseat the valve head 19 thereby permitting fluid to flow into the bore 11. When the trigger 5 is activated to fire the pellet 8, pressure in the fluid supply line 13 seats the valve head 19 at the bore entrance 20 thereby permitting only the volume of fluid in the bore 11 to flow into the bore 9 of the barrel 2 while projecting the pellet 8 outwardly through the barrel 2.

The trigger 5 and the pellet loading mechanism 3 cooperate to move the pellet 8 from a magazine 30 to the sealing position 29. In the illustrated structure, pressure on the trigger 5 overcomes a suitable resilient member, such as a compression spring 31, to pivot the trigger 5 about a suitable pin 32 and thereby move a link 33 out of engagement with an abutment portion 34 of a pellet loading and retaining member 35. The link 33 is pivotally mounted on the trigger 5, as on pin 36, and is movable between guides 37.

The pellet loading and retaining member 35 is movable between a pellet receiving position 38 and a pellet retaining position 39. When the link 33 is disengaged from the abutment portion 34, a suitable resilient member, such as a compressed spring 40, urges the pellet loading and retaining member 35 outwardly to the pellet receiving position 38. A suitable compressible spring 41 in the magazine 30 urges the pellet 8 onto the pellet loading and retaining member 35.

The pellet loading and retaining member 35 is manually moved toward the pellet retaining position 39 until the link 33 engages the abutment portion 34, as illustrated in FIG. 3. The spring 31 urges the link 33 into engagement with the abutment portion 34 through the trigger 5 and the pin 36.

In a modified form of the fluid valve 7 illustrated in FIG. 4, a link 42 retains a closure member 43 in a position to be engaged by the slidable seal member 21. The closure member 43 is positioned in a fluid passageway 44 of a modified outlet 45. The fluid passageway 44 extends from adjacent the shoulder 22 to adjacent the bore 9 of the barrel 2.

The closure member 43 is retained by the link 42 in a sealing position 46 where the closure member 43 sealingly engages the slidable seal member 43 sealingly engages the slidable seal member 21. Pressure on the trigger 5 moves the link 42 out of engagement with the closure member 43 thereby permitting the closure member 43 to move through the fluid passageway 44 to a firing position 47. When in the firing position 47, the closure member 43 engages a suitable abutment member 48 thereby retaining the closure member 43 in the fluid passageway 44. Fluid flows around the closure member 43 through the fluid passageway 44 to move a suitable projectile or pellet 49 outwardly through the bore 9 of the barrel 2.

A suitable loading lever 50 is pivotally mounted, as on pin 51, to move a pellet loading and supporting member 52 from a pellet supporting position 53 to a pellet receiving position 54 shown in dashed lines, and return to the pellet supporting position 53.

The pellet loading and supporting member 52 moves within guides 56 and is pivotally connected to the loading lever 50.

The stem valve 17, the magazine 30, the bore 15, the seal member 21, and the bore 11 are substantially as previously described and illustrated in FIG. 3.

FIG. 5 illustrates a modified form of the fluid valve 7 as illustrated in FIG. 4. The stem valve 17 is replaced by a suitable check valve 56 positioned within the bore 11. The check valve 56 is operative to permit fluid flow into the bore 11 while preventing escape of fluid from the bore 11 through the bore 15. The check valve 56 is suitably biased to seat on an end wall 14' of the fluid supply line 13 and seal the bore 15, as by being spring loaded thereby requiring pressure to move the check valve 56 from its seat on the end wall 14' and permit fluid to enter the bore 11.

Fluid under pressure in the form of surges or charges of fluid, as from an air pump mechanism 57 as shown in FIG. 6 flow through the fluid supply line 13 to and through the bore 15 where the fluid moves the check valve 56 from a position seated at an exit 58 of the bore 15. When the fluid pressure is insufficient to overcome the bias of the check valve 56 the check valve 56 remains seated at the exit 58.

A fluid volume adjustment member 59 is operative to adjust the fluid pressure within the bore 11 above or below the pressure supplied by the air pump mechanism 57, as later described. In the illustrated structure, the fluid volume adjustment member 59 is movable into and out of the chamber formed by the bore 11 and is illustrated as a screw having a threaded shank 60 threadedly engaged in a socket 61 positioned between the bore 15 forming the inlet to the chamber and the slidable seal member 21.

The pellet loading and supporting member 52, the loading lever 50, the closure member 43, the link 42, the abutment member 48, and the flow passageway 44 are substantially as previously described and illustrated in FIG. 4.

The air pump mechanism 57 is suitably mounted on the pellet firing gun 1 as illustrated in FIG. 6. The air pump mechanism 57 includes an air cylinder 62 receiving air through a plurality of air inlets or openings 63. Air within the air cylinder 62 is compressed by a piston 64 which is movable within the cylinder 62 between a retracted position 65 and an extended position 66. The piston has a face 67 which is positioned in the retracted position 65 to permit air to enter the cylinder 62 through the air inlets 63. The piston 64 is then moved to the extended position 66 to compress the air within the cylinder 62 thereby forcing the air through the inlet bore 15 by the check valve 56 and into the bore or chamber 11. In the extended position 66 the piston face 67 is adjacent the inlet bore entrance 20. A pressure seal member 68 is mounted on an exterior surface 69 of the piston 64 and is positioned to engage an interior surface 70 of the cylinder 62 thereby providing a substantially airtight seal as the piston 64 is moved from the retracted position 65 to the extended position 66. The air pump mechanism 57 is particularly adapted for use in the pellet firing gun 1 when the pellet 8 seals the bore 24 of the seal member 21 as illustrated in FIG. 3 and when the closure member 43 is employed to seal the outlet 45 as illustrated in FIGS. 4 and 5.

The fluid valve 7 as illustrated in FIG. 6 may be modified to include the volume adjustment member 59 as shown in FIG. 5 to adjust the air pressure within the bore 11 or multiple strokes of the piston 64 may be employed to increase the air pressure in the chamber formed in the bore 11.

The stem valve 17 may be employed in the fluid valve 7, however, only one stroke of the piston 64 will be effective to pressurize the bore 11 due to the tendency of the stem valve 17 to permit fluid pressure to equalize on each side of the fluid inlet bore 15 when the one end 28 of the stem 18 is engaged by the pellet 8 or the closure member 43.

FIG. 7 illustrates a modification of the inlet having a fluid supply line 71 with a portion 72 positioned substantially transverse to a modified inlet 73. The portion 72 of the fluid supply line 71 communicates with the modified inlet 73 at a fluid entrance point 74 positioned intermediate opposite ends 75 and 76 of the modified inlet 73. The end 75 of the inlet bore 73 is adjacent the interior surface 23 of the bore 11. An inlet seal member 77 is positioned in the inlet 73 between the fluid entrance point 74 and the end 75. The inlet seal member 77 is thereby positioned between the fluid entrance point 74 and the bore 11. An inlet seal member 78 is positioned between the fluid entrance point 74 and the other end 76 of the modified inlet 73. The portion 72 of the fluid supply line 71 and the fluid entrance point 74 is thereby positioned between the inlet seal members 77 and 78.

An elongate shaft or plunger 79 is positioned in the inlet 73 and has one end 80 adjustable between an extended position 81 and a retracted position 82. In the extended position 81 the one end 80 is positioned in the bore 11 and is adjacent the bore 9 of the barrel 2 however the one end 80 does not contact the pellet 8. FIG. 7 may be modified to employ the closure member 43 as illustrated in FIGS. 4 and 5. When the closure member 43 is employed the plunger 79 in the extended position 81 does not contact the closure member 43. In the retracted position 82 the one end 80 of the plunger 79 is positioned between the fluid entrance point 74 and the inlet seal member 78 thereby permitting fluid to flow into the bore 11.

A suitable handle or gripping portion 83 is mounted on the other end 84 of the plunger 79. The handle 83 is operative to move the plunger 79 between the retracted position 82 and the extended position 81, thereby adjusting the pressure of the fluid in the bore 11. As the one end 80 of the plunger 79 is moved toward the extended position 81 the pressure in the bore 11 is increased. The plunger 79 seals the inlet 73 except when in the retracted position 82. Fluid flows through the transverse portion 72 of the fluid supply line 71 into the bore 11 only when the plunger 79 is in the retracted position 82.

The plunger 79 may be employed in the pellet firing gun 1 when the pellet 8 is employed to seal the outlet of the bore 11 as illustrated in FIGS. 3, 6, and 7. The plunger 79 may also be employed in the pellet firing gun 1 when the closure member 43 is positioned in the fluid passageway 44 to seal the modified outlet 45, as illustrated in FIGS. 4 and 5.

The fluid valve 7 employing the stem valve 17 may be installed in a fluid line 85 as illustrated in FIG. 8. A closure member 86 is movable between a sealing position 87 engaging the slidable seal member 21 and a fluid flow position 88. The closure member 86 travels in guide grooves 89 between the sealing position 87 and the flow position 88. Suitable control means, such as a trigger or lever 90, is operative to move the closure member 86 from the sealing position 87 to the flow position 88.

The closure member 86 is mounted on a suitable shaft or link 92 which may be quickly activated to move the closure member 86 from the sealing position 87 to the flow position 88 in any suitable manner such as by cam action, mismatched holes, by being spring loaded, and by being pivotally connected to the trigger 90 as illustrated in FIG. 8.

The valve illustrated in FIG. 8 is particularly adapted to permit a measured volume of fluid, such as gas or liquid, to pass through the fluid valve 7 into a fluid flow line 91. When the measured volume of fluid flows into the fluid flow line 91, fluid pressure in the fluid line 85 moves the valve head 19 of the stem valve 17 into seating engagement with the bore entrance 20 thereby sealing the bore 15.

The valve illustrated in FIG. 8 may be adapted for continuous fluid flow except when the closure member 86 is in the sealing position 87 by omitting the end plug 14 and the stem valve 17.

It is to be understood that while I have illustrated and described certain forms of my invention, it is not to be limited to these specific forms or arrangement of parts herein described and shown except insofar as such limitations are included in the claims.

I claim:

1. A pellet firing mechanism comprising:
   a. a chamber having an interior surface and an inlet and an outlet;
   b. fluid supply means for supplying fluid under pressure to said inlet;
   c. valve means positioned at said inlet and operative for sealing said chamber against fluid flow through said inlet;
   d. a slidable seal member positioned within said chamber and operative for sealingly engaging a portion of said interior surface adjacent said outlet in response to pressure in said chamber, said seal member having a bore therethrough aligned with said outlet;
   e. an elongate barrel having a bore communicating with said outlet;
   f. a pellet positioned in said barrel;
   g. means for moving said pellet into and retaining said pellet in a position seating on said slidable seal member around the bore thereof whereby said chamber is sealed at said outlet;
   h. means operative to open said valve means for flow of fluid under pressure into said chamber to charge same while the pellet is seated against the slidable seal member; and
   i. said means operative to open said valve means comprising said pellet retaining means and said pellet retaining means being operative to release said pellet permitting fluid pressure in the chamber to propel the pellet in the barrel bore.

2. The pellet firing mechanism as set forth in claim 1 including:
   a. said inlet and said outlet and said bore in said barrel being axially aligned;
   b. said valve means being a stem valve having an elongate stem extending through said inlet into said chamber;
   said stem valve having a valve head on one end thereof movable to seal said inlet in response to fluid pressure from said fluid supply means; and
   d. said stem extending toward said outlet, the other end engaging said pellet when said pellet is moved into said outlet sealing position for movement of said valve head from said inlet sealing position.

3. The pellet firing mechanism as set forth in claim 2 including:
   a. a pellet loading member reciprocatable between a pellet receiving position and a pellet retaining position; and
   b. trigger means releasably engaging said loading member.

4. The pellet firing mechanism as set forth in claim 1 including
   a. an air pump mechanism being operative to supply fluid under pressure to said chamber inlet; and
   b. said valve means being a check valve positioned in said chamber and operative to permit fluid to enter said chamber and to prevent escape of said fluid charge from said chamber through said inlet.

5. The pellet firing mechanism as set forth in claim 4 including: a fluid volume adjustment member being movable into and out of said chamber whereby fluid pressure in said chamber is adjustable.

6. The pellet firing mechanism as set forth in claim 4 wherein said air pump mechanism includes:

a. an air cylinder having an interior surface and a plurality of air inlets;
b. a piston in said cylinder having an exterior surface, said piston being reciprocatable between a retracted position and an extended position, said piston in said retracted position being positioned to permit air to enter said cylinder through said air inlets, said extended position being adjacent said chamber inlet; and
c. a pressure seal member mounted on said piston exterior surface for sealingly engaging said cylinder interior surface.

7. In a pellet firing gun, a pellet firing mechanism comprising:
a. a chamber having an interior surface and an inlet and an outlet;
b. fluid supply means for supplying fluid under pressure to said inlet;
c. valve means position at said inlet and operative for sealing said chamber against fluid flow through said inlet;
d. a slidable seal member positioned within said chamber and operative for sealingly engaging a portion of said interior surface adjacent said outlet in response to pressure in said chamber, said seal member having a bore therethrough aligned with said outlet;
e. an elongate barrel having a bore communicating with said outlet;
f. a closure member positioned in said outlet and movable between a sealing position and a firing position, said closure member engaging said slidable seal member when in said sealing position;
g. a fluid passageway positioned in said outlet between said chamber and said barrel;
h. an abutment member positioned in said fluid passageway to be engaged by said closure member when in said firing position;
i. means for moving said closure member into the retaining said closure member in said sealing position and for releasing said closure member for movement to said firing position;
j. means operative to open said valve means for flow of fluid under pressure into said chamber to charge same while said closure member is seated against said slidable seal member; and
k. a pellet positioned in said barrel adjacent said fluid passageway whereby said pellet is discharged from said barrel by fluid pressure through said fluid passageway upon release of said closure member.

8. The pellet firing mechansim as set forth in claim 7 including:
a. said inlet and said bore in said barrel being axially aligned;
b. said valve means being a stem valve having an elongate stem extending through said inlet into said chamber;
c. said stem valve having a velve head on one end thereof movable to seal said inlet in response to fluid pressure from said fluid supply means; and
d. said stem other end extending toward said outlet, the other end engaging said closure member when said closure member is moved into said sealing position for movement of said valve head from said inlet sealing position.

9. The pellet firing mechanism as set forth in claim 8 including:
a. a pellet loading member positioned substantially transverse to said barrel and reciprocatable between a pellet receiving position and a pellet supporting position; and
b. cocking means for moving said loading member from said pellet supporting position to said pellet receiving position and return.

10. The pellet firing mechanism as set forth in claim 7 including:
a. said valve means being a check valve positioned in said chamber and operative to permit fluid to enter said chamber and to prevent escape of said fluid charge from said chamber through said inlet,
b. a fluid volume adjustment member being movable into and out of said chamber whereby fluid pressure in said chamber is adjustable;
c. an air cylinder having an interior surface and a plurality of air inlets;
d. a piston in said cylinder, said piston having an exterior surface, said piston being reciprocatable between a retracted position and an extended pisition, said piston in said retracted position being positioned to permit air to enter said cylinder through said air inlets, said extended position being adjacent said chamber inlet; and
e. a pressure seal member mounted on said piston exterior surface for sealingly engaging said cylinder interior surface.